United States Patent Office 2,807,635
Patented Sept. 24, 1957

2,807,635

SILICON AMINES

Heyme Breederveld, Bloemendaal, and Hein Israel Waterman, Delft, Netherlands, assignors to Shell Development Company, Emeryville, Calif., a corporation of Delaware No Drawing. Application March 25, 1954,
Serial No. 418,744

Claims priority, application Great Britain May 9, 1952

14 Claims. (Cl. 260—448.2)

This invention relates to novel silicon amines. The invention relates more particularly to novel silicon-containing compounds wherein silicon is linked to the nitrogen atom of at least one amino radical obtained by the removal of hydrogen from the nitrogen of a tert-alkyl amine, and wherein any silicon valence not directly linked to nitrogen is linked to halogen. The present application is a continuation-in-part of co-pending application Serial No. 352,975, filed May 4, 1953, now abandoned.

The novel compounds of the present invention comprise the silicon amines which contain no direct silicon-to-carbon linkage and wherein all linkage of silicon-to-carbon-containing groups is through a nitrogen atom. The amino derivatives of silicon of the invention, referred to herein as aminosilanes and aminohalosilanes, are represented by the following empirical formula:

$$X_{4-n}Si(Am)_n \qquad (I)$$

in which Am is the radical obtained by removing hydrogen from the nitrogen atom of a tert-alkyl amine wherein the nitrogen atom is linked directly to at least one tertiary carbon atom contained in a tert-alkyl group, X is halogen, and $n$ is a whole number having a value of one to four inclusive. Representative tertiary carbon atom-containing alkyl radicals which are directly attached through a tertiary carbon atom to the nitrogen atom of the amino group represented by Am in the foregoing empirical Formula I, include, for example, the tert-butyl radical, and the branch chain amyl, hexyl, heptyl, octyl radicals, and homologues thereof, which contain a tertiary carbon atom.

The silicon amines of the present invention may be obtained by replacing one or more halogen atoms of a silicon tetrahalide with a tert-alkylamino radical, for example, a tert-butylamino radical. The above-defined amino derivatives of silicon tetrahalide are obtained by reacting silicon tetrahalide with a sufficient quantity of a tert-alkyl amine, for example, tert-butylamine, at a sufficiently elevated temperature, and separating the desired compound from the resulting reaction mixture. The particular reaction temperature employed will be governed by the specific compound desired. Thus, the amino derivatives of silicon containing two tert-alkylamino groups linked directly to silicon are obtained by combining a silicon tetrahalide, such as, for example, silicon tetrachloride, with a tert-alkyl amine, such as tert-butylamine, at a temperature of from about room temperature to about 100° C. In preparing the compounds of the invention by reaction of a silicon halide compound with a tert-alkyl amine, the amine is added in substantial molar excess over the amount required to effect the replacement of the requisite number of halogen atoms in the starting silicon halide compounds.

Example I

Tert-butylaminotrichlorosilane was prepared by reacting 101 g. (0.59 mole) of silicon tetrachloride in 400 cc. of ether with a solution of 29 g. (0.40 mole) of tert-butylamine in 100 cc. of dry ether. The reaction was carried out at room temperature in a three-necked flask equipped with a mechanical stirrer, a dropping funnel and a reflux condenser. Solids formed were separated by filtration. The solids were washed with ether. The filtrate and ether-wash were combined and distilled. The distillation resulted in the obtaining of 15 g. of tert-butylaminotrichlorosilane having a boiling range of 48–51° C. at 12 mm. Hg with a yield of 37% of the theoretical. The product had the following properties: melting range —51° to —48° C.; chlorine content observed: 52.0; 51.8%; Cl calculated: 51.5%; silicon content: 13.7%; 13.7%; Si calculated: 13.6%.

In lieu of emeploying a silicon tetrahalide as starting material in the production of silicon amines of the invention there may be employed an aminohalosilane containing less amino groups directly linked to the silicon atom than in the desired final product. Thus, di(tert-butylamino)dichlorosilane may be obtained by reacting tert-butyl-aminotrichlorosilane with tert-butylamine under the conditions employed in the foregoing Example I for the reaction of the tert-butylamine with silicon tetrachloride. Tri-(tert-butylamine)chlorosilane and tetra(tert-butyl amino) silane are prepared by reacting silicon tetrachloride, tert-butylaminotrichlorosilane or di(tert-butylamino) dichlorosilane with tert-butylamine at suitable conditions. Tert-butylaminotrichlorosilane need not be employed as such as the starting material in reacting further amounts of tert-butylamine therewith but may be employed, for example, in the form of the total reaction mixture obtained by reacting silicon tetrachloride with tert-butylamine. Thus, the di(tert-butylamino)dichlorosilane may be obtained from silicon tetrachloride and tert-butylamine by increasing substantially the ratio of tert-butylamine to silicon tetrachloride initially charged and/or increasing the severity of operating conditions, that is, by prolonging contact time and/or increasing the temperature.

Example II

To a solution of 29 g. (0.17 mole) of silicon tetrachloride in 200 cc. of ether there was added a solution of 50 g. (0.68 mole) of tert-butylamine in 200 cc. of ether. The reaction was carried out at room temperature in a three-necked flask equipped with a mechanical stirrer, a dropping funnel and a reflux condenser. Solids were removed from the resulting reaction mixture by filtration and the precipitate was washed with ether. Ether-wash and filtrate were combined and distilled. The distillation resulted in the obtaining of 24 g. of di(tert-butylamino) dichlorosilane having a boiling range of 98–101° C. at 14 mm. Hg. This represents a yield of 58% of theoretical. The product thus obtained had the following properties: melting range: —9 to —6° C.; refractive index $n_D^{20}$: 1.4484; density $d_4^{20}$: 1.0358; refractivity $r$ observed: 0.2586; $r$ calculated: 0.2591; Cl observed: 29.5; 29.6%; Cl calculated: 29.2%; Si observed: 11.6; 11.5%; Si calculated: 11.5%.

It had been found that preparation of the amino silicon compounds of the invention containing more than two tert-alkylamino groups directly linked to the silicon atom is somewhat more difficult than the preparation of the lower homologues thereof, requiring the use of temperatures in the range of, for example, from about 80 to about 350° C. Thus, in the preparation of tri(tert-alkylamino)halosilanes by reaction of a silicon tetrahalide, a tert-alkylaminotrihalosilane or a di(tert-alkylamino)dihalosilane with a tert-alkyl amine, temperatures ranging, for example, from about 80° C. to about 250° C. and higher may be used. The specific temperature preferably employed in this range will depend to some extent upon the nature of the particular starting materials. Formation of tri(tert-butylamino)halosilanes is brought about by heating at a temperature in the range of from about 125° C. to about 250° C., and in a suitable solvent, di(tert-butylamino)halosilane in admixture with tert-butylamine, as evidenced by the following example:

*Example III*

Tri(tert-butylamino)chlorosilane was prepared by reacting 54 g. (0.22 mole) di(tert-butylamino)dichlorosilane with 36 g. (0.49 mole) of tert-butylamine in 40 cc. of benzene at 150° C. and a contact time of six hours. Solids formed during the reaction were filtered from the reaction mixture. The precipitate was washed with benzene. The combined filtrate and benzene-washings were distilled. The distillation resulted in the obtaining of 46 g. tri(tert-butylamino)chlorosilane boiling in the range of 138–141° C. at 34 mm. Hg. This represents a yield of the desired product equal to 74% of the theoretical. The product had the following characteristics: melting range: 17–18° C.; refractive index $n_D^{20}$: 1.4460; density $d_4^{20}$: 0.9309; $r$ observed: 0.2865; $r$ calculated: 0.2863; Cl observed: 13.0; 13.0%; Cl calculated: 12.7%; Si observed: 9.99; 9.97%; Si calculated: 10.0%.

Preparation of a tetra(tert-alkylamino)silane by interaction of silicon tetrahalide with a tert-alkyl amine or a (tert-alkylamino)halosilane necessitates the use of a temperature in the range of, for example, from about 200° C. to about 350° C. Formation of tetra(tert-butylamino)silane by reaction of tri(tert-butylamino)chlorosilane with silicon tetrahalide is brought about at temperatures of from about 225° C. to about 300° C.

*Example IV*

Heating tri(tert-butylamino)chlorosilane with a substantial molar excess of tert-butylamine at 250° C., for six hours, in a carius tube, resulted in the obtaining of a reaction mixture in which the presence of tetra(tert-butylamino)silane was determined.

Without intent to limit in any wise the scope of the invention by theory advanced herein to set forth more fully the nature of the invention, it is believed that the difficulty with which the tetra(tert-alkylamino)silanes are formed is due to steric hindrance.

In a preferred method of preparing the tri(tert-alkylamino)chlorosilanes and the tetra(tert-alkylamino)silanes of the invention by reaction of a silicon tetrahalide with a tert-alkyl amine, such as, for example, tert-butylamine, the reaction is preferably initiated at a relatively low temperature, for example, from about 20 to about 80° C. and completed within the more elevated temperature range of 80 to 350° C. set forth above. If desired, an intermediate product comprising (tert-alkylamino)halosilanes containing a lesser number of tert-alkylamino groups directly attached to the silicon atom than in the desired final product may be separated from the reaction mixture at an intermediate stage of the process and thereafter subjected to higher temperature conditions in admixture with substantial amounts of added tert-alkyl amine.

Particularly desirable aminohalosilanes of the invention comprise those wherein the halogen is chlorine, bromine or iodine. Halogen compounds preferably employed as starting materials in the preparation of silicone amines of the invention comprise those wherein the halogen is bromine, chlorine or iodine. Behavior of the various specific halogen compounds is not always identical under given operating conditions. In certain cases wherein the formation of a specific tert-alkylamino derivative of silicon using reactants containing a specific halogen is rendered extremely difficult due to steric hindrance, the use of reactants differing by the presence therein of a different halogen will at times enable the reaction to proceed with greater ease under otherwise substantially identical reaction conditions.

In the preparation of the amino silicon compounds of the invention by the methods disclosed herein the starting materials are generally dissolved or suspended in suitable solvents. Suitable solvents comprise any organic solvent which is substantially inert under the conditions of execution of the reactions or which does not result in the production of materials detrimental to efficient execution of the reaction. Suitable solvents comprise, for example, aromatic hydrocarbons, such as benzene, xylene, toluene, and aliphatic ethers such as ethyl ether; and the like.

The products of the invention are of value as intermediate or starting materials in the production of valuable chemical derivatives therefrom. They are of use as components of, and addition agents for waterproofing agents. They may be employed as a starting materials, intermediate materials or addition agents in the production of lubricants.

The invention claimed is:

1. Amino silicon compounds of the general formula $$X_{4-n}Si(Am)_n$$

wherein X is halogen, Am is a tert-alkylamino radical obtained by removing hydrogen from the nitrogen atom of a tert-alkyl amine, and $n$ is a whole number having a value of one to four inclusive.

2. The amino silicon compounds of claim 1, wherein said amine is a tert-butylamine.

3. Amino silicon compounds of the general formula $$X_{4-n}Si(Am)_n$$

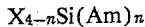

wherein X is chlorine, Am is a tert-butylamino radical, and $n$ is a whole number having a value of one to four inclusive.

4. Tert-butylaminotrichlorosilane.
5. Di(tert-butylamino)dichlorosilane.
6. Tri(tert-butylamino)chlorosilane.
7. Tetra(tert-butylamino)silane.
8. The process for the production of amino silicon compounds selected from the group consisting of tetra(tert-alkylamino)silane and tert-alkylaminohalosilanes wherein the atoms linked to silicon are amino nitrogen and halogen atoms only, which comprises reacting a silicon tetrahalide with tert-alkylamine at a temperature in the range of from about 20° C. to about 350° C.
9. The process for the production of amino silicon compounds selected from the group consisting of tetra(tert-butylamino)silane and tert-butylaminochlorosilanes wherein the atoms linked to silicon are amino nitrogen and chlorine atoms only, which comprises reacting a silicon tetrachloride with tert-butylamine at a temperature in the range of from about 20° C. to about 350° C.
10. The process for the production of tri(tert-butylamino)chlorosilane, which comprises reacting a member of the group consisting of silicon tetrachloride, tert-butylaminotrichlorosilane and di(tert-butylamino)dichlorosilane with tert-butylamine at a temperature in the range of from about 125° C. to about 200° C.
11. The process for the production of tri(tert-alkylamino)halosilanes, which comprises reacting a member of the group consisting of silicon tetrahalide, mono(tert-alkylamino)trihalosilanes and di(tert-alkylamino)dihalosilane with tert-alkylamine at a temperature in the range of from about 80° C. to about 250° C.
12. The process for the production of tetra(tert-butylamino)silane, which comprises reacting a member of the group consisting of silicon tetrachloride, tert-butylaminotrichlorosilane, di(tert-butylamino)dichlorosilane and tri(tert-butylamino)chlorosilane with tert-butylamine at a temperature in the range of from about 225° C. to about 300° C.
13. The process for the production of terta(tert-alkylamino)silanes, which comprises reacting a member of the group consisting of silicon tetrahalide, tert-alkylaminotrihalosilane, di(tert-alkylamino)dihalosilane and tri(tert-alkylamino)halosilane with a tert-alkyl amine at a temperature in the range of from about 225° C. to about 300° C.

14. The process for the production of reaction mixtures containing at least one member of the group consisting of tri(tert-butylamino)chlorosilane and tetra(tert-butyl)silane which comprises heating a mixture containing tetrachlorosilane and a molar excess of tert-butylamine at a temperature in the range of from about 20° C. to about 80° C. and thereafter heating at least a part of the resulting reaction mixture at a temperature of from about 80° C. to about 350° C.

References Cited in the file of this patent

Lengfeld: "Am. Chem. Journal," vol. 21 (1899), pages 531–537.

Trost: "Canadian Jour. of Chemistry," vol. 29 (1951), pp. 1075–78.

Trost: "Canadian Jour. of Chemistry," vol. 30 (1952), pp. 842–843.